United States Patent
Mankovski (10) Patent No.: US 9,229,899 B1
(45) Date of Patent: *Jan. 5, 2016

(54) INFORMATION TECHNOLOGY SYSTEM COLLABORATION

(71) Applicant: CA, Inc., Islandia, NY (US)

(72) Inventor: Serge Mankovski, Toronto (CA)

(73) Assignee: CA, Inc., New York, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/011,522

(22) Filed: Aug. 27, 2013

Related U.S. Application Data (63) Continuation of application No. 12/147,053, filed on Jun. 26, 2008, now Pat. No. 8,601,068.

(51) Int. Cl.
*G06F 15/16* (2006.01)
*G06F 15/163* (2006.01)

(52) U.S. Cl.
CPC .................... *G06F 15/163* (2013.01)

(58) Field of Classification Search
None
See application file for complete search history.

(56) References Cited

U.S. PATENT DOCUMENTS

| | | | | |
|---|---|---|---|---|
| 5,278,901 A * | 1/1994 | Shieh | ............... | G06F 21/552 713/188 |
| 5,704,017 A * | 12/1997 | Heckerman | .......... | H04N 21/252 706/12 |
| 6,185,689 B1 * | 2/2001 | Todd, Sr. | ............... | G06F 21/577 705/53 |
| 6,253,337 B1 * | 6/2001 | Maloney | ............... | G06F 21/552 713/188 |
| 6,266,773 B1 * | 7/2001 | Kisor | .................... | G06F 21/554 714/E11.202 |
| 6,345,239 B1 * | 2/2002 | Bowman-Amuah | ... | G06Q 20/10 703/6 |
| 6,446,134 B1 | 9/2002 | Nakamura | | |
| 6,832,341 B1 | 12/2004 | Vijayan | | |
| 6,907,430 B2 * | 6/2005 | Chong | .................. | G06F 21/577 1/1 |
| 7,089,590 B2 * | 8/2006 | Judge | ...................... | G06F 21/55 726/22 |
| 7,243,148 B2 * | 7/2007 | Keir | ..................... | G02B 5/3083 709/224 |
| 7,260,632 B2 | 8/2007 | Shaffer et al. | | |
| 7,370,359 B2 * | 5/2008 | Hrabik | ............... | H04L 63/1433 713/189 |
| 7,376,969 B1 * | 5/2008 | Njemanze | .............. | G06F 21/55 709/224 |
| 7,467,183 B2 | 12/2008 | Arcuri et al. | | |
| 7,472,421 B2 * | 12/2008 | Cummins | ............... | G06F 21/55 709/221 |
| 7,506,373 B2 * | 3/2009 | Morin | ................ | G06Q 20/0855 340/566 |
| 7,522,531 B2 * | 4/2009 | Joiner | ................. | H04L 63/1408 370/245 |
| 7,526,808 B2 * | 4/2009 | Lynn | .................... | H04L 41/0893 380/255 |
| 7,636,424 B1 | 12/2009 | Halikhedkar et al. | | |
| 2002/0178383 A1 * | 11/2002 | Hrabik | ............... | H04L 63/1433 726/4 |
| 2003/0051026 A1 * | 3/2003 | Carter | ..................... | H04L 12/24 709/224 |
| 2003/0097588 A1 * | 5/2003 | Fischman | ........... | H04L 41/0213 726/25 |
| 2003/0188189 A1 * | 10/2003 | Desai | .................... | H04L 63/145 726/23 |
| 2003/0195861 A1 * | 10/2003 | McClure et al. | ........ | H04L 41/12 1/1 |

(Continued)

OTHER PUBLICATIONS

U.S. Appl. No. 12/147,053, Final Office Action mailed Aug. 18, 2010, 12 pgs.

(Continued)

*Primary Examiner* — Ranodhi Serrao
(74) *Attorney, Agent, or Firm* — Gilliam IP PLLC (57) ABSTRACT

A computer implemented method includes detecting an event in a multi-component information technology system. Multiple parties having an interest in the event are identifies. An interactive collaboration mechanism is created and access to the collaboration mechanism is provided to the identified multiple parties having an interest in the event.

22 Claims, 4 Drawing Sheets

(56) References Cited

U.S. PATENT DOCUMENTS

| | | | | |
|---|---|---|---|---|
| 2003/0217039 | A1* | 11/2003 | Kurtz | G02B 5/3083 1/1 |
| 2003/0233567 | A1* | 12/2003 | Lynn | H04L 41/0893 726/23 |
| 2004/0015728 | A1* | 1/2004 | Cole | G02B 5/3083 726/23 |
| 2004/0078384 | A1* | 4/2004 | Keir | G02B 5/3083 1/1 |
| 2004/0158629 | A1 | 8/2004 | Herbeck et al. | |
| 2005/0102382 | A1 | 5/2005 | MacGregor et al. | |
| 2005/0108387 | A1 | 5/2005 | Li et al. | |
| 2005/0204404 | A1* | 9/2005 | Hrabik | H04L 63/1433 726/22 |
| 2006/0064486 | A1* | 3/2006 | Baron | H04L 41/0886 709/224 |
| 2006/0069912 | A1* | 3/2006 | Zheng | H04L 63/0823 713/151 |
| 2007/0100986 | A1 | 5/2007 | Bagley et al. | |
| 2007/0118905 | A1* | 5/2007 | Morin | G06Q 20/0855 726/23 |
| 2007/0283007 | A1* | 12/2007 | Keir | G02B 5/3083 709/224 |
| 2007/0283441 | A1* | 12/2007 | Cole | G02B 5/3083 726/25 |
| 2008/0172743 | A1* | 7/2008 | Aaron | G06F 21/577 726/25 |
| 2008/0201763 | A1* | 8/2008 | Lynn | H04L 41/0893 726/1 |
| 2009/0327416 | A1 | 12/2009 | Mankovski | |

OTHER PUBLICATIONS

U.S. Appl. No. 12/147,053, Notice of Allowance mailed Jul. 26, 2013, 12 pgs.
U.S. Appl. No. 12/147,053, Response filed Jun. 3, 2010 to Non Final Office Action mailed Mar. 3, 2010, 8 pgs.
U.S. Appl. No. 12/147,053, Response filed Oct. 21, 2010 to Final Office Action mailed Aug. 18, 2010, 9 pgs.
U.S. Appl. No. 12/147,053Non-Final Office Action mailed Mar. 3, 2010, 10 pgs.

\* cited by examiner

INFORMATION TECHNOLOGY SYSTEM COLLABORATION

RELATED APPLICATIONS

This application is a continuation of, and claims priority to, U.S. patent application Ser. No. 12/147,053, filed Jun. 26, 2008, which is incorporated herein by reference in its entirety.

BACKGROUND

Enterprise IT infrastructure today touches on multiple and diverse aspects of business and technology. No single IT management system can cover all these aspects at the same time. This creates a situation where each point of view is locked into disconnected systems that rarely communicate to each other directly. There have been numerous attempts to integrate these management systems so that all these points of view are aggregated together into a single user interface. The main idea of this approach is simple. If there is a single interface then a single decision maker can have access to the data available through a "single pane of glass," the integrated interface. However it is not practical because in vast majority of cases IT management decision is made by a group of people. It turns out that different groups of users are using only some parts of the "single pane of glass" interface and do not use others. It results in bloated and complicated user interfaces where only parts of the interface pertaining to the role and expertise of the decision maker are used and the rest is ignored.

SUMMARY

A computer implemented method includes detecting an event in a multi-component information technology system. Multiple parties having an interest in the event are identified and an interactive collaboration mechanism is identified. Access to the collaboration mechanism is provided to the identified multiple parties having an interest in the event. In one embodiment, a machine readable medium has instructions for executing the method on a machine.

In one embodiment, a system includes an event detector that detects an event in a multi-component information technology system. A reconciliation engine identifies multiple parties interested in the event. A collaboration system provides an interactive collaboration mechanism to provide access to the collaboration mechanism to the identified multiple parties having an interest in the event.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Various embodiments may provide communication and collaboration features in information technology (IT) management systems. In one embodiment, a point-of-attention based method of sets up communication channels between the participants of enterprise IT management processes. IT management systems support this technique by bringing problematic parts of the system to the attention of multiple parties identified as having an interest in such parts of the system.

Figure 1:
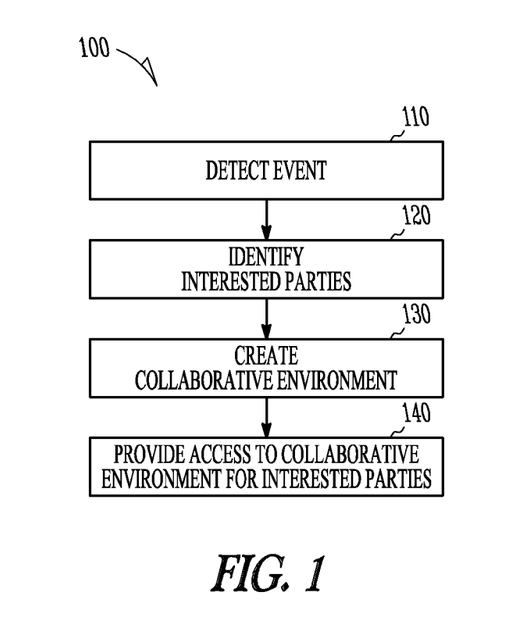
FIG. 1 is a flowchart illustrating a computer implemented method of providing a collaborative environment to parties interested in an event according to an example embodiment.

A computer implemented method is illustrated at 100 in FIG. 1. At 110, an event is detected in a multi-component information technology system. Multiple parties having an interest in the event are identified at 120. An interactive collaboration mechanism is created at 130, and access to the collaboration mechanism is provided at 140 to the identified multiple parties having an interest in the event. In one embodiment, the process is iterative, in that interested parties continue to be identified at 120 and provided access to the collaborative mechanism, also referred to as a collaborative environment. Further, interested parties may join or leave the collaborative mechanism at their convenience as indicated at 150. As other topics of interest are identified, other collaborative mechanisms may be identified and interested parties provided access.

In various embodiments, the interactive collaboration method may already exist and creation of it may consist of associating it with the detected event. Communication between the identified multiple parties are facilitated in the collaboration mechanism, which may take the form of one or more of a chat room and a conference call. The chat room may be any type of network type construct that facilitates communication between multiple parties. It may be a shared document in one embodiment, or a discussion group in further embodiments. Many other types of collaborative applications may be used to facilitate communication between interested parties. In one embodiment, the collaboration mechanism is a shared workspace communication facility. In still a further embodiment, an autonomous bot is used to represent a party in the collaborative mechanism. In further embodiments, the communications may be logged to provide an accessible record for analysis of the event and potential solutions.

In one embodiment, identifying multiple parties may include monitoring activities of parties and correlating such activities to the event. An example activity may include viewing a change order related to the event. The monitored activities may be recorded in a relational database in various tables, and such tables may be joined to correlate the activities to the event. In one example, an inventory table may include an inventory of network cards and a network table may include MAC addresses of network cards. A party interested in asset management and party interested in network management may be performing different activities related to inventory and network aspects. They may be provided access to the collaboration mechanism.

In a further embodiment, correlation may be performed using an approximate matching mechanism. Such mechanisms may be probabilistic, rule-based, ontology-based, etc.

In one embodiment, activities may include activities representative of noticing the event. Activities representative of noticing the event may include but are not limited to opening files related to the event, accessing functions affected by the event, performing activities that gave rise to an event. In a further embodiment, the activities may be representative of an interest in a subject giving rise to the event.

In one embodiment, a machine readable medium has instructions for execution on a machine to perform the above embodiments.

Figure 2:
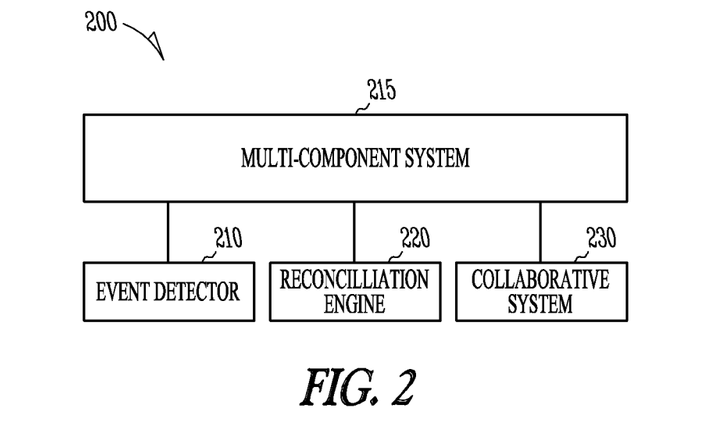
FIG. 2 is a block diagram of a system for providing a collaborative environment to parties interested in an event according to an example embodiment.

A system is illustrated at 200 in FIG. 2. An event detector 210 may operate to detect an event in a multi-component information technology system 215. A reconciliation engine 220 may operate to identify multiple parties interested in the event. A collaboration system 230 may operate to provide an interactive collaboration mechanism that provides access to the collaboration mechanism to the identified multiple parties having an interest in the event. In one embodiment, the reconciliation engine 220 identifies multiple parties by correlating activities of parties to interest by the parties in the event.

Figure 3:
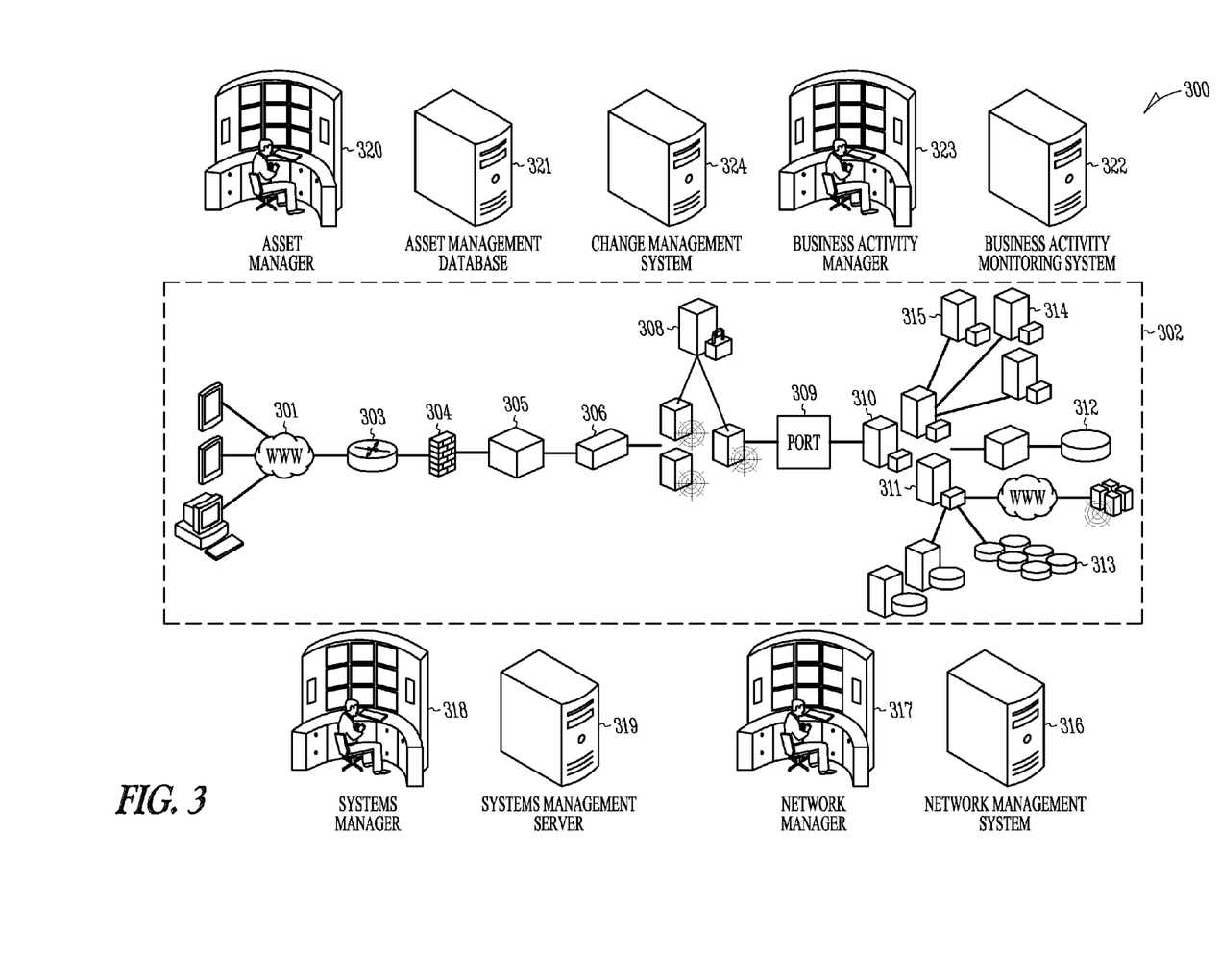
FIG. 3 is a block diagram of an enterprise information technology system according to an example embodiment.

FIG. 3 is a block diagram of an enterprise information technology system 300. System 300 may take many different shapes, and include many different components. Different parties may be interested in different parts of the system. Users are generally concerned with applications that may be running Storage subsystems may be provided by third parties, and may be managed by different parties. Other parties may be concerned with I/O systems, some with database applications, such as optimizing performance of databases by ensuring that appropriate indices, tables and views are provided. The functions involved in detecting events, identifying interested parties and facilitating collaboration may be provided by just about any component, or set of components in various embodiments.

In system 300, a typical enterprise IT system topology with new event collaboration, customers indicated at 301 connect to a corporate system 302 through the World Wide Web or other network in various embodiments. When a customer 301 opens a web page a web page request travels through a router 303, firewall 304, a switch 305, and a load balancer 306. The load balancer 306 can direct the request to one of many web servers 307 that will serve the page to the customer 301. If authentication is required, then web server 307 might call to an identity management system 308 to validate customer credentials.

After validation, web server 307 sends the request to a portal 309 and one or more of many applications 310 that may process the request. Depending on the nature of the request, the application or applications 310 may make calls to one or more backend systems such as applications 311, database server 312, database server 313, personnel management system 314, business management system 315, and various third party applications. As multiple users connect to the web server for different web pages, web page requests travel through different parts of the system.

While customers are accessing the web pages, enterprise system managers, such as a network manager 317 working with a network management system 316, systems manager 318 working with a systems management server 319, asset manager 320 working with an asset management database 321 and business activity manager 323 working with a business activity monitoring system 322 monitor the corporate IT system 302 to keep it operational and ensure the best service to the customers 301. If a problem occurs, it may be brought up to attention of the managers. The same problem in the IT system may be brought to the attention of different managers. The managers and customers may each be interested parties in various embodiments.

As an example, suppose there was a recent change to one of the database servers 313. Suppose this change causes overload condition on the database server 313 when customer 301 requests are traveling through it. A business activity monitoring system 322 will bring this problem to attention of the business activity manager 323. The business activity manager 323 will be presented with information representing the business impact of the failure on the database server 313. Business activity manager 323 will know the relative importance of service rendered by the failing server in respect to the failures accruing on the other servers. However, business activity manager 323 will not have data about causes of the failure and will not have any means of fixing it. At the same time the same problem on the same server may be presented to the systems manager 18 via a systems management server 319. The systems manager 318 will be presented with information about current load on the database server 313, however, the systems manger 318 will not know what services are provisioning through the server 313 and will not know relative importance of the problem on server 313.

In current systems, a typical scenario for resolving this problem would require the business activity manager 323 to open a problem ticket with a change management system 324. Change management system 324 will propagate the change request to the Network Manager 317, systems manager 318, and asset manager 320. At the same time the systems manager 318 would also open a problem ticket in the change management system 324 for a seemingly different problem. Change management system 324 will also propagate the change request to the network manager 317, business process manager 323 and asset manager 320. As the result there are two change tickets for the same problem and extra workload for the asset manager 320 and network manager 317 that might have nothing to do with the problem. The process of resolution of the problem becomes unnecessary complicated. The source of this problem is in the lack of communication between the business process manager 323 and systems manager 318.

Figure 4:
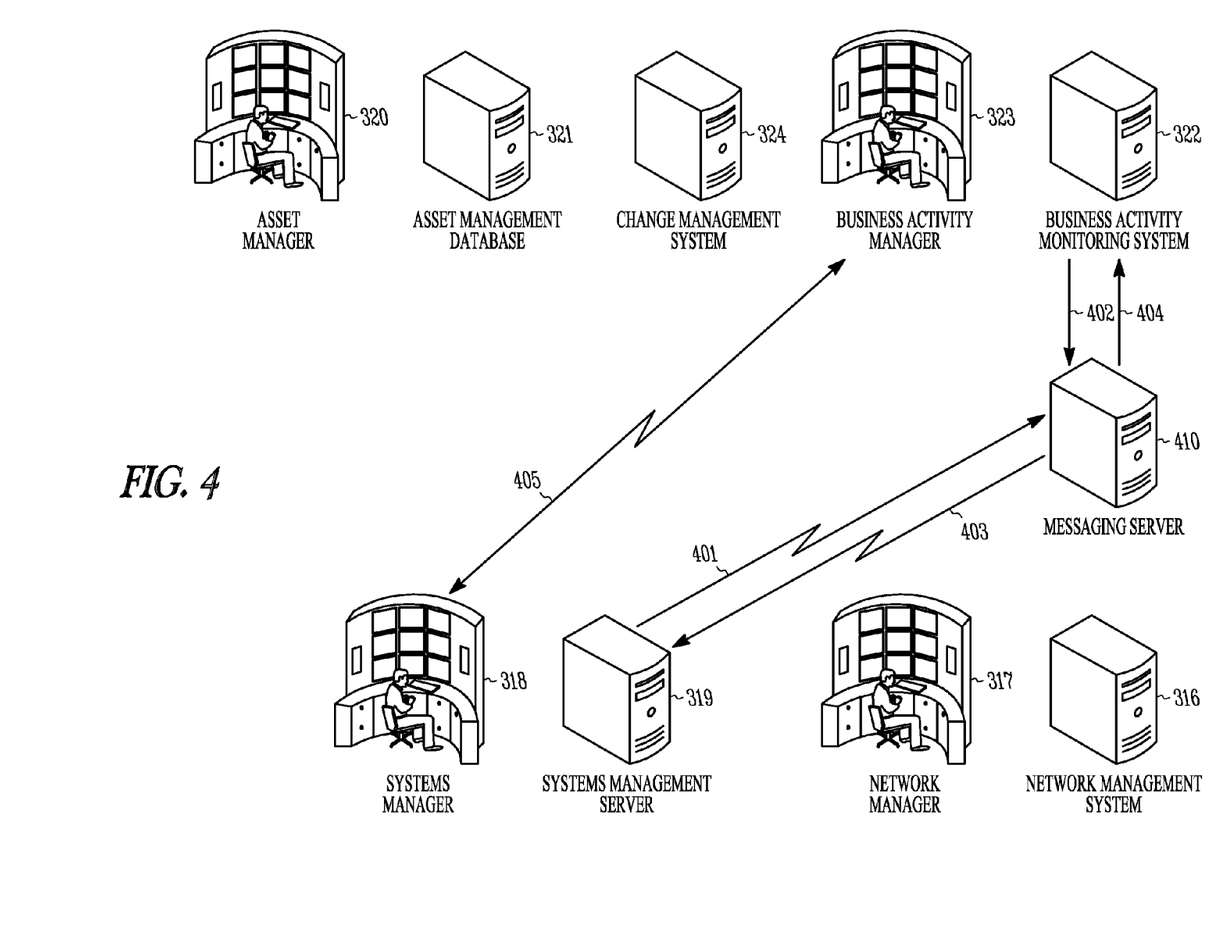
FIG. 4 is a block diagram of an enterprise information technology system having a messaging server according to an example embodiment.

The operation of various components is illustrated in FIG. 4, with consistent numbering is illustrated in FIG. 3, in response to an example event, such as an overload condition on the database server 313. FIG. 4 is simplified in that the system 302 is not illustrated to simplify the diagram. The event may be detected by the systems management server 319 which alerts system manager 318 about the server problem. Systems manager 18 reacts to the alert by opening a user interface form corresponding to the database server 313. During creation of the user interface form, systems management server 319 signals at 401 to a messaging server 410 with a request to register the systems manager 318 in a chat room associated with the ID of the database server 313. If messaging server 326 did not have a chat room associated with the failing database server 313 it creates a new chat room, associates it with the data base server ID and places systems manager 318 in that chat room.

At approximately the same time business activity system 322 alerts business activity manager 323 about the problem with the database server 313. Business activity manager 323 brings up a user interface form that corresponds to the database server 313. Business activity system signals at 402 to messaging server 410 with request to register business activity manager 323 with the chat room associated with the database server 313. In this case messaging server 410 finds an existing chat room and places the business activity manager 323 into that chat room. Messaging server 410 sends presence notifications at 403, 404) to business activity system 322 and systems management server 319 indicating that there are other people or parties whose attention is directed towards the database server 313 in question.

Business activity system 322 alerts business activity manager 323 about presence of other people concerned with the database server 313. At the same time systems management server 319 alerts systems manager 318 about the presence of other parties concerned about the database server 313.

At this point both business activity manager 323 and systems manager 318 are presented with a user interface to initiate communication with each other. Any one is now capable to initiate the communication. If initiated, the communication can be carried out by an instant messaging system, a teleconferencing system or any other collaborative mechanism under control of the messaging server 410.

When any participating party closes the user interface form or explicitly leaves the communication media, signals 402, 403 are sent to the messaging server 410 and the messaging server 410 notifies 403, 404 other participants about such closings of the user interface form or leaving a collaborative mechanism. When the last participants closes his user interface form or leaves the communication, the messaging server 410 discards the chat room and makes and retains chat content, list of participants and other relevant information in a log.

The described method can be applied to any number of participants using any system capable of connecting to the messaging server 410, providing signals 401, 402, 403 and 404, and establishing a communication session 405. In further embodiments, additional systems may provide for reconciliation of identity of problematic component(s) and may involve invitation of arbitrary participants in the communication associated with a problematic component.

A variety of methods may be used to identify that attention is drawn to or interest demonstrated toward a particular event, or system related to the event. In various embodiments, interest may be demonstrated as a function of a time window, frequency of lookups, duration of mouse hover, and other typical user or party actions.

In one example embodiment, a collaborative environment may be identified or created by using an IRC chat server as the messaging server 410, IRC chat clients on the desktop systems of the participants 318, 323 and IRC interface components working on the enterprise IT management systems 319, 322 for providing signals 401, 402, 403, and 404. In a further embodiment, SIP protocol may be used for messaging and multimedia session setup. Real time voice and video capabilities as well as shared workspace communication facilities may also be provided. Mechanisms to disable propagation of presence information upon user request may also be provided. In still further embodiments, autonomous agents (bots) may be used to represent system components 316, 321, and 324 in a collaborative embodiment. Commands may be generated to communicate with the autonomous agents (bots) representing system components.

Collaboration features of prior IT management systems are not developed. Perhaps this is due to the fact that a single-purpose IT management system does not require much of collaboration, but when all of them are put together in a context of an enterprise, then it was recognized by the inventor that collaboration between the users of these systems becomes important. The creation of seamless communication channels between all stakeholders whose attention is drawn to a particular component of enterprise infrastructure.

Communication between business activity manager and systems manager can result in only one change request in one embodiment will be opened with the change management system 324. Business activity manager can communicate relative business importance of a failing component in the bigger picture of service provisioning. This can result in better alignment between business and IT activities and expedite resolution of problems of high business importance.

Figure 5:
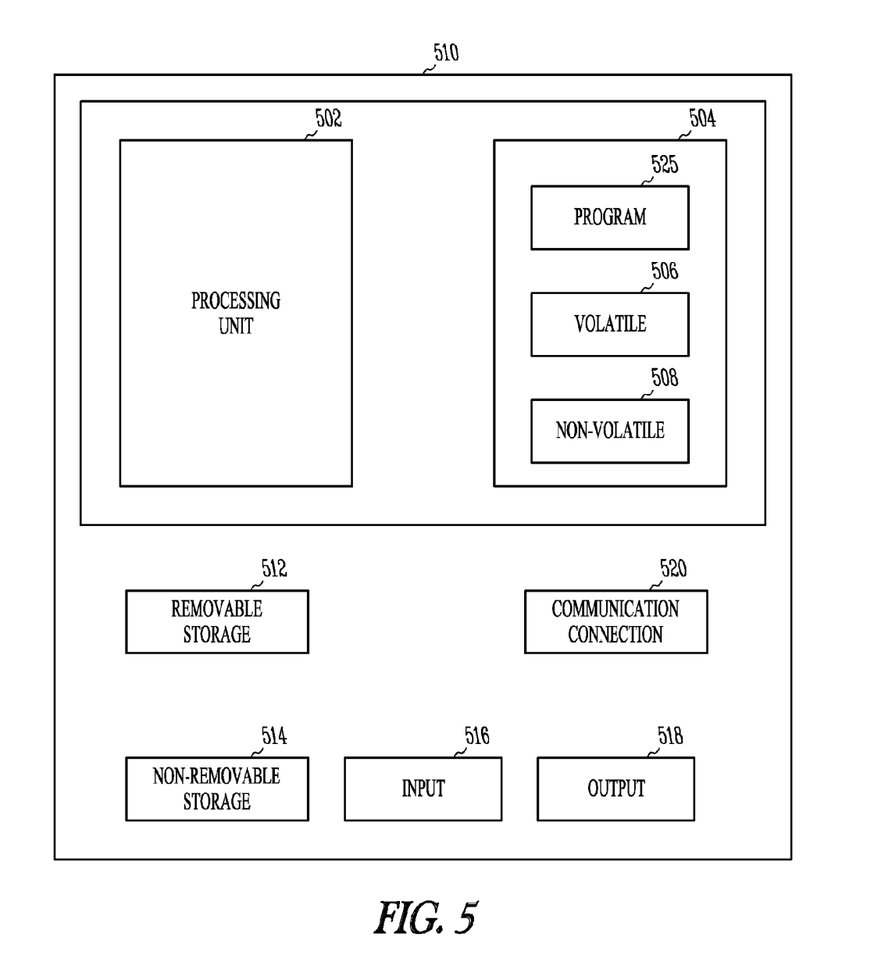
FIG. 5 is a block diagram of a typical computer system for implementing selected components of an enterprise information technology system and performing computer implemented methods in accordance with an example embodiment.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A computer implemented method comprising:
   detecting, by a processor, an event in a multi-component information technology system;
   iteratively identifying two or more information technology (IT) managers having an interest in the event, wherein identifying comprises monitoring activities of the two or more IT managers, wherein monitored activities are recorded in tables of a relational database, and the tables are joined to correlate the activities to the event, and wherein activities include activities representative of noticing the event, activities representative of interest in a related change request, and activities representative of an interest in a subject giving rise to the event;
   presenting to each IT manager information relating to an impact of the event on a management area of each IT manager;
   creating an interactive collaboration mechanism among the two or more IT managers; and
   providing access to the interactive collaboration mechanism to the identified IT managers having an interest in the event.

2. The method of claim 1 further comprising facilitating communication between the identified IT managers in the interactive collaboration mechanism.

3. The method of claim 2 wherein the interactive collaboration mechanism is a chat room.

4. The method of claim 2 wherein the interactive collaboration mechanism is a conference call.

5. The method of claim 2 and further comprising logging such communications.

6. The method of claim 1 wherein activities include viewing a change order related to the event.

7. The method of claim 1 wherein correlation of the activities to the event is performed using an approximate matching mechanism.

8. The method of claim 1 wherein identifying comprises correlating activities of parties to interest by the parties in the event.

9. The method of claim 1, further comprising generating a single problem ticket relating to the event as a result of the collaboration among the two or more IT managers.

10. The method of claim 1, wherein identifying comprises:
    correlating the monitored activities to the event;
    wherein the monitored activities include one or more of opening files related to the event, accessing functions affected by the event, and performing activities that gave rise to the event.

11. A non-transitory machine readable storage medium having instructions for information technology system collaboration, the instructions to:
    detect an event in a multi-component information technology system;
    iteratively identify two or more information technology (IT) managers having an interest in the event, wherein the instructions to iteratively identify comprise instructions to monitor activities of the two or more IT managers, wherein monitored activities are recorded in tables of a relational database, and the tables are joined to correlate the activities to the event, and wherein activities include activities representative of noticing the event, activities representative of interest in a related change request, and activities representative of an interest in a subject giving rise to the event;
    presenting to each IT manager information relating to an impact of the event on a management area of each IT manager;
    creating an interactive collaboration mechanism among the two or more IT managers; and
    providing access to the interactive collaboration mechanism to the identified IT managers having an interest in the event.

12. The machine readable medium of claim 11, further comprising instructions to facilitate communication between the identified IT managers in the interactive collaboration mechanism.

13. The machine readable medium of claim 12 wherein the interactive collaboration mechanism is a chat room or a conference call and the machine readable medium further comprises instructions to log communications occurring in the chat room or conference call.

14. The machine readable medium of claim 12 wherein the interactive collaboration mechanism is a shared workspace communication facility.

15. The machine readable medium of claim 13 wherein an autonomous bot is used to represent an IT manager in the interactive collaborative mechanism.

16. The machine readable medium of claim 11 wherein the instructions to identify multiple IT managers comprise instructions to to correlate activities of parties to interest by the parties in the event.

17. The machine readable medium of claim 11, wherein the machine readable medium further comprises instructions to generate a single problem ticket relating to the event as a result of the collaboration among the two or more IT managers.

18. The machine readable medium of claim 11, wherein the instructions to identify comprises instructions to:
    correlate the monitored activities to the event;
    wherein the monitored activities include one or more of opening files related to the event, accessing functions affected by the event, and performing activities that gave rise to the event.

19. A system comprising:
    a processor;
    a machine-readable medium, the machine readable medium having instructions stored therein the instructions executable by the processor to cause the system to,
    detect an event in a multi-component information technology system;
    iteratively identify two or more information technology (IT) managers interested in the event, wherein the instructions to iteratively identify comprise instructions executable by the processor to cause the system to monitor activities of the two or more IT managers, wherein monitored activities are recorded in tables of a relational database, and the tables are joined to correlate the activities to the event, and wherein activities include activities representative of noticing the event, activities representative of interest in a related change request, and activities representative of an interest in a subject giving rise to the event;
    present to each IT manager information relating to an impact of the event on a management area of each IT manager; and
    provide an interactive collaboration mechanism and provide access to the collaboration mechanism to the identified IT managers having an interest in the event.

20. The system of claim 19 wherein the instructions to identify multiple IT managers comprise instructions executable by the processor to cause the system to correlate activities of parties to interest by the parties in the event.

21. The system of claim 19, wherein the machine readable medium further comprises instructions to generate a single problem ticket relating to the event as a result of the collaboration among the two or more IT managers.

22. The system of claim 19, wherein the instructions to identify the two or more IT managers having an interest in the event comprises instructions executable by the processor to cause the system to:
   correlate the monitored activities to the event;
   wherein the monitored activities include one or more of opening files related to the event, accessing functions affected by the event, and performing activities that gave rise to the event.

* * * * *